Figure 1:
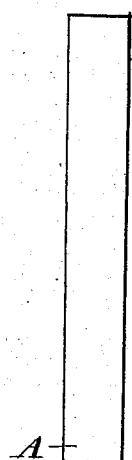

No. 889,478. PATENTED JUNE 2, 1908.
C. E. MILLER & L. D. METCALF.
SAW SET.
APPLICATION FILED MAY 27, 1907.

WITNESSES.
Earl Young
James Webb

INVENTORS
Charles E. Miller
Lorenzo D. Metcalf
by Henry L. Reynolds.
their attorney.

UNITED STATES PATENT OFFICE.

CHARLES E. MILLER AND LORENZO D. METCALF, OF WHATCOM COUNTY, WASHINGTON.

SAW-SET.

No. 889,478.      Specification of Letters Patent.      Patented June 2, 1908.

Application filed May 27, 1907. Serial No. 376,024.

*To all whom it may concern:*

Be it known that we, CHARLES E. MILLER and LORENZO D. METCALF, citizens of the United States, and residents of Whatcom county, Washington, have invented certain new and useful Improvements in Saw-Sets, of which the following is a specification.

Our invention relates to an improvement in saw setting devices, and comprises the novel parts and combinations of parts hereinafter described and particularly set forth in the claims.

The object of our invention is to improve and simplify devices of this character, and in particular to produce a tool of this kind which shall be exact and reliable in its action, durable in use and simple and cheap in manufacture.

In the drawings we have shown our invention embodied in the form which is now preferred by us. There are however, other forms which would be essentially the same as this which would fall within the scope of our invention.

Figure 2:
Figure 3:
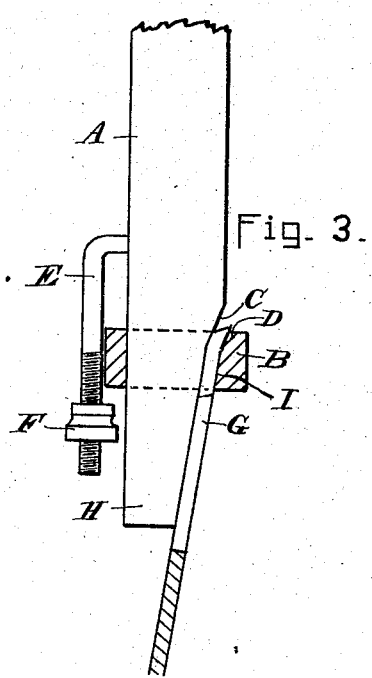
Figure 4:
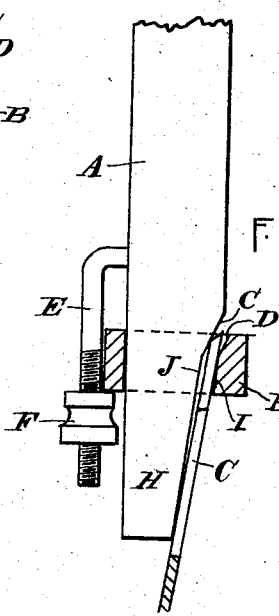
Figure 5:
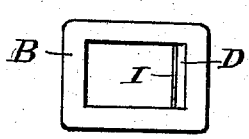

Figure 1 is an elevation of our device shown in position on a saw tooth. Fig. 2 is a similar elevation taken from a point at right angles to that of Fig. 1, the stirrup or anvil member being shown in section and the parts in the position occupied before setting. Fig. 3 is a side view with the parts in the position occupied after the tooth has been set. Fig. 4 is a view similar to Fig. 4, showing the device adjusted for a thinner saw. Fig. 5 shows the stirrup or anvil member separately.

There are only two parts of our device which are strictly essential, the punch or hammer member A, and the stirrup or anvil member B. While the other parts contribute to the convenience of our device they are not strictly essential.

The punch or hammer member A, consists of a bar of steel having an inclined or cam-like surface on one side or edge, as at C, said surface acting upon the tip of the saw tooth to swage or bend it outwardly, thereby giving the tooth the "set," desired.

The stirrup or anvil member, B, is in the form of a ring, B, surrounding the punch A, and free to slide thereon. This stirrup has an inclined or cam surface, D, which is complemental and opposed to the surface C, on the punch. The surface D, should be inclined away from the axis of the punch, or, rather, from the face against which the saw tooth contacts, an amount at least equal to the angle of set which it is desired to give the tooth. The angle of the surface C, should ordinarily be the same or approximately the same. The surfaces I and J, of stirrup and punch, should be approximately parallel when the stirrup is square with the punch.

The threaded rod E, and nut F, serve to prevent the stirrup or anvil, B, from dropping off the punch A, and also to hold it approximately square across the punch and to one side so that the tooth receiving opening is maintained at all times, thereby making it easy to place the device over the saw tooth.

Adjustment of the position of the nut F, serves to control the amount of set given for a given thickness of saw and also to adjust for given thicknesses of saws. For a lighter set, or for a given set on a thinner saw, the nut is moved upward, that is, farther upon the rod. For a heavier set, or for the same set on a thicker saw, the nut is moved farther out on the rod.

In Figs. 2 and 4, the parts are shown in position for setting, while in Fig. 3, is shown the position of completed setting. In Figs. 2 and 4 it will be noticed that there is a space between the surface J and the tooth, the tip of the saw tooth bearing upon the inclined surface C, at a point determined by the amount of this opening, which amount of opening is determined by the position of the nut F. The tooth bears at three points, on the lower end of the punch, upon the slope C, and at the point of merging of the surfaces D and I on the stirrup. As the punch is driven down it enters farther within the stirrup B, bending over the tooth point until it is clamped between the surfaces C and D and the body of the tooth is clamped between the surfaces I and J, or until the condition shown in Fig. 3 is reached.

It is evident that, with the nut F lowered, the space for the reception of the saw tooth is increased and it will enter farther, with a resulting heavier set. It is also evident that for a thinner saw a given set will require a corresponding lesser space, that is, a raising of the nut F.

In using our device the stirrup or anvil member B, is placed over a saw tooth, after the manner shown in Figs. 1 and 2, and the end of the punch A, hit a smart blow with a hammer. This drives the punch down within the stirrup and against the tip of the saw tooth, bending it over against the surface D, and giving it a permanent set. This set is determined in angle by the angle of the inclined surfaces C and D, relative to the surfaces I and J, and is independent of the force of the blow so long as it is sufficient to bend over the tooth tip. The amount of the tooth point bent over depends upon the amount which projects beyond the lower edge of the surface D and this is controlled by the amount of slack between the punch and stirrup. All the teeth of the saw may therefore be set exactly alike, which will greatly improve the action of the saw.

We have described our invention as designed for operation under the blow of a hammer. The manner of forcing the two parts together is immaterial. Any other means for doing this would answer and would fall within the scope of our invention.

What we claim and desire to secure by Letters Patent is:

1. A saw-set comprising a punch member having a side face adapted, when in use, to lie against the side of the saw tooth being set, and having a tooth-setting incline above said face, and an opposed anvil member supported from and freely movable longitudinally of said punch member.

2. A saw-set comprising a punch member having a side face adapted, when in use, to lie against the side of the saw tooth being set, and also having a tooth-setting incline above said face, and an anvil member in the form of a stirrup surrounding said punch member and free to slide thereon.

3. A saw set comprising a punch member having a tooth-setting incline on one side, an anvil member in the form of a stirrup surrounding said punch member and free to slide thereon, and means for controlling the amount of said sliding movement to thereby control the amount of set.

In testimony whereof, we have hereunto affixed our signatures this 15th day of May, 1907, in the presence of the two subscribing witnesses.

CHARLES E. MILLER.
LORENZO D. METCALF.

Witnesses:
J. W. ROMAINE,
J. R. CRITES.